United States Patent
Cho et al.

(10) Patent No.: US 12,353,555 B2
(45) Date of Patent: Jul. 8, 2025

(54) SYSTEMS AND METHODS TO SUPPORT DRIFT DETECTION IN COMPLEX INFORMATION HANDLING SYSTEM PLATFORMS COMPRISED OF REPLACEABLE COMPONENTS

(71) Applicant: Dell Products, L.P., Round Rock, TX (US)

(72) Inventors: Eugene David Cho, Austin, TX (US); Marshal F. Savage, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 322 days.

(21) Appl. No.: 18/184,134

(22) Filed: Mar. 15, 2023

(65) Prior Publication Data

US 2024/0311469 A1    Sep. 19, 2024

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC .......................... G06F 21/57; G06F 2221/034
See application file for complete search history.

(56) References Cited

U.S. PATENT DOCUMENTS

| | | | | |
|---|---|---|---|---|
| 2014/0068276 A1* | 3/2014 | Imamoto | ............... | G06F 21/602 713/192 |
| 2021/0182434 A1* | 6/2021 | Baldwin | ............... | H04L 9/0877 |
| 2023/0308439 A1* | 9/2023 | Nagaraj | .................. | G06F 21/44 |
| 2024/0089111 A1* | 3/2024 | Blum | ...................... | G06F 21/57 |

OTHER PUBLICATIONS

Trusted Computing Group, "TCG PC Client Platform Firmware Profile Specification," Level 00 Version 1.05 Revision 23, Family "2.0," May 7, 2021, pp. 146, © TCG 2021.
Trusted Computing Group, "TCG Server Management Domain Firmware Profile Specification," Family "2.0," Level 00 Revision 1.00, May 1, 2020, pp. 53, © TCG 2020.
DMTF, "Security Protocol and Data Model (SPDM) Specification," Document Identifier: DSP0274, Version: 1.0.1, Mar. 19, 2021, 61 pages.

* cited by examiner

*Primary Examiner* — David J Pearson
(74) *Attorney, Agent, or Firm* — Fogarty LLP

(57) ABSTRACT

In drift detection for complex IHS platforms comprised of replaceable components an IHS a security processor may present a number of hieratical sets of Platform Configuration Registers (PCRs) as Virtualized PCR Engines (VPEs) corresponding to IHS platform hardware, sub-domains, and/or central processing units. An IHS aggregation engine may collect measure(s) of platform components, populate the PCRs of the VPEs, and maintain a platform-level VPE and PCR event log from sub-domains of the platform. The measure(s) may be collected indirectly from component Security Protocols and Data Models (SPDM) and/or directly over Management Component Transport Protocol (MCTP), Inter-Integrated Circuit (I2C), Peripheral Component Interconnect Express (PCIe) and/or via Serial Peripheral Interconnect (SPI). The measure(s) may include vendor certificate authority (CA) certificates for feeding into the PCRs. The VPE hierarchy structure enables hardware, firmware, IHS configuration and/or vendor CA certificate drift detection at boot-time and/or component Operating System (OS) measurement during runtime.

20 Claims, 9 Drawing Sheets

SYSTEMS AND METHODS TO SUPPORT DRIFT DETECTION IN COMPLEX INFORMATION HANDLING SYSTEM PLATFORMS COMPRISED OF REPLACEABLE COMPONENTS

FIELD

This disclosure relates generally to Information Handling Systems (IHSs), and, more specifically, to drift detection in complex IHS platforms comprised of replaceable components.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Drift is a problem in IHSs, particularly in complex devices (e.g., IHS platforms) comprised of replaceable components. For example, configuration drift may be caused by inconsistent configuration items across the platform. Configuration drift occurs, particularly, when changes to software and hardware are made ad hoc. Drift accounts for many high availability and disaster recovery system failures. Typically, to prevent configuration drift, administrators have traditionally maintained detailed information about the network addresses of hardware devices as well as what software versions are running on them, and which updates have been applied. Drift detection is a comparison between a validated baseline and the IHS platform (e.g., server) configuration which includes hardware configuration, firmware, and driver versions. In complex devices comprised of replaceable components, drift detection typically only occurs at firmware update time (verifying build time measurement) which does not provide comprehensive drift detection coverage. For example, existing drift detection systems and methods do not take advantage of boot-time and runtime measurements.

Also, in complex devices comprised of replaceable components, a number of Security Protocols and Data Models (SPDM) related problems may arise. Statically imbedded vendor root certificate authorities (RootCAs) in products, typically have difficulty keeping up all of the vendor Certificate Authority (CA) life cycle management (e.g., tens of individual CA revocations, additions of new CAs, etc.).

SUMMARY

Embodiments of systems and methods to support drift detection in complex Information Handling System (IHS) platforms comprised of replaceable components are described. In an illustrative, non-limiting example an IHS security processor may present a number of hieratical sets of Platform Configuration Registers (PCRs) as Virtualized PCR Engines (VPEs) corresponding to IHS platform hardware, sub-domains, and/or central processing units. An IHS aggregation engine collects measure(s) of IHS platform components, populates the PCRs of the VPEs and maintains an IHS platform level VPE and PCR event log from sub-domains of the IHS platform. VPEs may be defined for IHS slots and or on subsystems and/or per field replaceable unit. The VPE's hierarchy structure enables hardware drift detection, firmware drift detection, IHS configuration drift detection and/or vendor certificate authority (CA) certificate drift detection at boot-time and/or component operating system (OS) measurement during runtime.

The aggregation engine may be a Baseboard Management Controller (BMC) of the IHS, and/or the aggregation engine may be a host process carried out by (a) Central Processing Unit(s) (CPU(s)) of the IHS. The aggregation engine may collect the measure(s) of IHS components indirectly from Security Protocols and Data Models (SPDM) of the respective component and/or directly over Management Component Transport Protocol (MCTP), Inter-Integrated Circuit (I2C), Peripheral Component Interconnect Express (PCIe) and/or via Serial Peripheral Interconnect (SPI). Additionally, collection of the measure(s) of IHS components may include collection of vendor CA certificates from the IHS components, and populating the PCRs of the VPEs may further include feeding the certificates into the PCRs, enabling drift detection of the vendor CA certificates and measurement of the IHS component.

Thusly, drift detection in a complex IHS platform comprised of replaceable components may include the IHS aggregation engine discovering a platform type, and the aggregation engine and/or the security processor may establish a secure channel session among the aggregation engine, the security processor and/or one or more components in the IHS. The aggregation engine requests a VPE tree and/or topology from the security processor and the security processor may create the VPE tree for the IHS, to return a list of handles and mapping of IHS platform components to the aggregation engine. The aggregation engine may create a VPE log structure, based on the list of handles and mapping of the IHS platform components and in response to detection of a new component in the IHS by the aggregation engine, the aggregation engine may send a topology rediscovery trigger to the security processor. In response to the trigger, the security processor may create a new VPE and return a handle and map of the new VPE to the aggregation engine for the aggregation engine to update the VPE log structure, based on the handle and map of the new VPE.

Also, in response to a trigger of drift detection, the aggregation engine gathers one or more measurements from each IHS platform component and provides the one or more measurements to the security processor. The security processor updates a requested VPE PCR, and/or the security processor updates a requested VPE PCR key derivation function. Updating the requested VPE PCR may be carried out for hashed-based drift detection and/or for hash-based message authentication code based remote attestation. The aggregation engine then updates a VPE log entry of the VPE log structure, based on the updated requested VPE PCR and/or the updated requested VPE PCR key derivation function. The aggregation engine may then determine if the triggered draft detection is complete, and in response to a determination that the triggered draft detection is not complete, the aggregation engine may repeat gathering of one or more measurements from the IHS component(s) and provide the one or more measurements to the security processor. The security processor may then repeat the updating of the requested VPE PCR and/or updating of the requested VPE PCR key derivation function. The aggregation engine may then also repeat updating of the VPE log entry.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

For purposes of this disclosure, an "Information Handling System" (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. For example, an IHS may, in accordance with embodiments of the present systems and methods, be a server (e.g., blade server, compute sled, storage sled, etc.) installed in modular IHS chassis with an Enclosure Controller (EC) (e.g., a modular IHS chassis EC) or any other suitable platform device. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
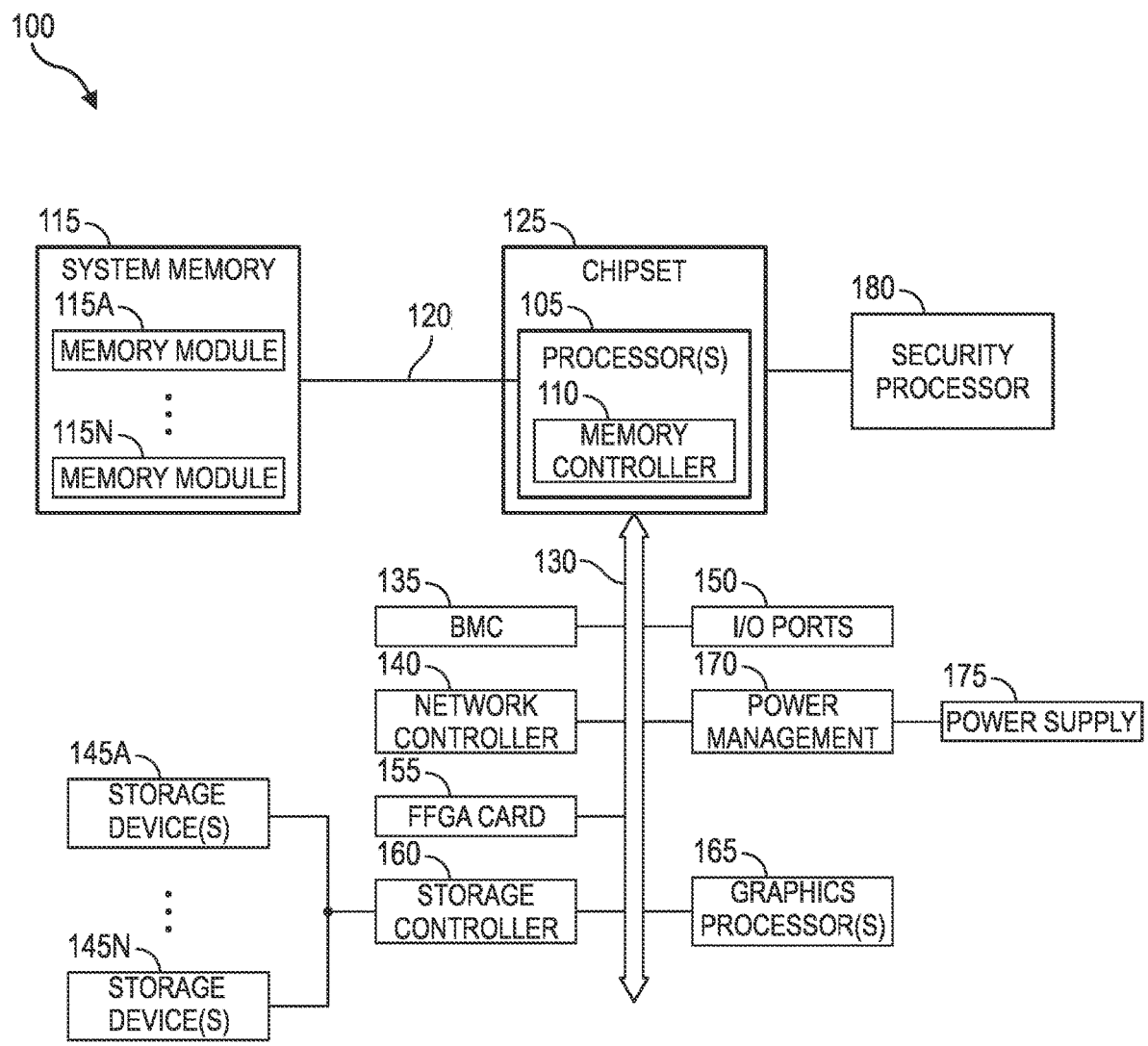
FIG. 1 is a block diagram illustrating components of an example of an Information Handling System (IHS), according to some embodiments.

FIG. 1 is a block diagram illustrating components of example IHS 100, according to some embodiments. IHS 100 may utilize one or more processors 105. In some embodiments, processors 105 may include a main processor and a co-processor, each of which may include a plurality of processing cores that, in certain scenarios, may each be used to run an instance of a server process. In certain embodiments, one or all of processor(s) 105 may be graphics processing units (GPUs) in scenarios where IHS 100 has been configured to support functions such as multimedia services and graphics applications.

As illustrated, processor(s) 105 includes an integrated memory controller 110 that may be implemented directly within the circuitry of the processor 105, or the memory controller 110 may be a separate integrated circuit that is located on the same die as the processor 105. The memory controller 110 may be configured to manage the transfer of data to and from the system memory 115 of the IHS 105 via a high-speed memory interface 120. The system memory 115 is coupled to processor(s) 105 via a memory bus 120 that provides the processor(s) 105 with high-speed memory used in the execution of computer program instructions by the processor(s) 105. Accordingly, system memory 115 may include memory components, such as static RAM (SRAM), dynamic RAM (DRAM), NAND Flash memory, suitable for supporting high-speed memory operations by the processor(s) 105. In certain embodiments, system memory 115 may combine both persistent, non-volatile memory and volatile memory.

In certain embodiments, the system memory 115 may be comprised of multiple removable memory modules. The system memory 115 of the illustrated embodiment includes removable memory modules 115a-n. Each of the removable memory modules 115a-n may correspond to a printed circuit board memory socket that receives a removable memory module 115a-n, such as a DIMM (Dual In-line Memory Module), that can be coupled to the socket and then decoupled from the socket as needed, such as to upgrade memory capabilities or to replace faulty memory modules. Other embodiments of IHS memory 115 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 100 may utilize chipset 125 that may be implemented by integrated circuits that are coupled to processor(s) 105. In this embodiment, processor(s) 105 is depicted as a component of chipset 125. In other embodiments, all of chipset 125, or portions of chipset 125 may be implemented directly within the integrated circuitry of processor(s) 105. The chipset may provide the processor(s) 105 with access to a variety of resources accessible via one or more buses 130. Various embodiments may utilize any number of buses to provide the illustrated pathways served by bus 130. In certain embodiments, bus 130 may include a Peripheral Component Interconnect Express (PCIe) switch fabric that is accessed via a PCIe root complex.

As illustrated, IHS 100 includes Baseboard Management Controller (BMC) 135 to provide capabilities for remote monitoring and management of various aspects of IHS 100. In support of these operations, BMC 135 may utilize both in-band, sideband and/or out of band communications with certain managed components of IHS 100, such as, for example, processor(s) 105, system memory 115, chipset 125, network controller 140, storage device(s) 145, etc. BMC 135 may be installed on the motherboard of IHS 100 or may be coupled to IHS 100 via an expansion slot provided by the motherboard. As a non-limiting example of a BMC, the integrated Dell Remote Access Controller (iDRAC) from Dell® is embedded within Dell PowerEdge™ servers and provides functionality that helps information technology (IT) administrators deploy, update, monitor, and maintain servers remotely. BMC 135 may include non-volatile memory having program instructions stored thereon that are usable by CPU(s) 105 to enable remote management of IHS 100. For example, BMC 135 may enable a user to discover, configure, and manage BMC 135, setup configuration options, resolve and administer hardware or software problems, etc. Additionally, or alternatively, BMC 135 may include one or more firmware volumes, each volume having one or more firmware files used by the BIOS' firmware interface to initialize and test components of IHS 100.

IHS 100 may also include the one or more I/O ports 150, such as USB ports, PCIe ports, Trusted Platform Module (TPM) connection ports, HDMI ports, audio ports, docking ports, network ports, Fibre Channel ports and other storage device ports. Such I/O ports 150 may be externally accessible or may be internal ports that are accessed by opening the enclosure of IHS 100. Through couplings made to these I/O ports 150, users may couple IHS 100 directly to other IHSs, storage resources, external networks and a vast variety of peripheral components.

As illustrated, IHS 100 may include one or more FPGA (Field-Programmable Gate Array) cards 155. Each of the FPGA card 155 supported by IHS 100 may include various processing and memory resources, in addition to an FPGA logic unit that may include circuits that can be reconfigured after deployment of IHS 100 through programming functions supported by the FPGA card 155. Through such reprogramming of such logic units, each individual FGPA card 155 may be optimized to perform specific processing tasks, such as specific signal processing, security, data mining, and artificial intelligence functions, and/or to support specific hardware coupled to IHS 100. In some embodiments, a single FPGA card 155 may include multiple FPGA logic units, each of which may be separately programmed to implement different computing operations, such as in computing different operations that are being offloaded from processor 105.

IHS 100 may include one or more storage controllers 160 that may be utilized to access storage devices 145*a-n* that are accessible via the chassis in which IHS 100 is installed. Storage controller 160 may provide support for RAID (Redundant Array of Independent Disks) configurations of logical and physical storage devices 145*a-n*. In some embodiments, storage controller 160 may be an HBA (Host Bus Adapter) that provides more limited capabilities in accessing physical storage devices 145*a-n*. In some embodiments, storage devices 145*a-n* may be replaceable, hot-swappable storage devices that are installed within bays provided by the chassis in which IHS 100 is installed. In embodiments where storage devices 145*a-n* are hot-swappable devices that are received by bays of chassis, the storage devices 145*a-n* may be coupled to IHS 100 via couplings between the bays of the chassis and a midplane of IHS 100. In some embodiments, storage devices 145*a-n* may also be accessed by other IHSs that are also installed within the same chassis as IHS 100. Storage devices 145*a-n* may include SAS (Serial Attached SCSI) magnetic disk drives, SATA (Serial Advanced Technology Attachment) magnetic disk drives, solid-state drives (SSDs) and other types of storage devices in various combinations.

Processor(s) 105 may also be coupled to a network controller 140 via bus 130, such as provided by a Network Interface Controller (NIC) that allows the IHS 100 to communicate via an external network, such as the Internet or a Local Area Network (LAN). In some embodiments, network controller 140 may be a replaceable expansion card or adapter that is coupled to a motherboard connector of IHS 100. In some embodiments, network controller 140 may be an integrated component of IHS 100.

A variety of additional components may be coupled to processor(s) 105 via bus 130. In certain embodiments, a graphics processor 165 may be comprised within one or more video or graphics cards, or an embedded controller, installed as components of the IHS 100. Processor(s) 105 may also be coupled, such as via bus 130 and chipset 125, to power management unit 170 that may interface with Power Supply Unit (PSU) 175 of IHS 100.

In certain embodiments, IHS 100 may operate using a BIOS (Basic Input/Output System) that may be stored in a non-volatile memory accessible by the processor(s) 105. The BIOS may provide an abstraction layer by which the operating system of the IHS 100 interfaces with the hardware components of the IHS. Upon powering or restarting IHS 100, processor(s) 105 may utilize BIOS instructions to initialize and test hardware components coupled to the IHS, including both components permanently installed as components of the motherboard of IHS 100, and removable components installed within various expansion slots supported by the IHS 100. The BIOS instructions may also load an operating system for use by the IHS 100. In certain embodiments, IHS 100 may utilize Unified Extensible Firmware Interface (UEFI) in addition to or instead of a BIOS. In certain embodiments, the functions provided by a BIOS may be implemented, in full or in part, by the remote access controller (RAC) 135. In some embodiments, BIOS may be configured to identify hardware components that are detected as being currently installed in IHS 100. In such instances, the BIOS may support queries that provide the described unique identifiers that have been associated with each of these detected hardware components by their respective manufacturers. In providing an abstraction layer by which hardware of IHS 100 is accessed by an operating system, BIOS may identify the I/O ports 150 that are recognized and available for use.

In some embodiments, IHS 100 may include a TPM that may include various registers, such as Platform Configuration Registers (PCRs), and a secure storage, such as an NVRAM (Non-Volatile Random-Access Memory). As such, a TPM may contain information such as PCRs, as well as sensitive information, such as storage keys, Storage-Root-Keys (SRKs), (an) Endorsement-Keys (EK(s)), Attestation Identity Keys (AIKs), etc. The TPM, which may be (a part of) a TPM controller chip, or the like, which may, in turn be a part of the BIOS and/or chipset 125, may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 100. For example, with respect to PCRs, to store a new value in a PCR, the existing value is extended with a new value and the existing value is concatenated with the argument of a TPM extend operation. The resulting concatenation is then used as input to an associated hashing algorithm, which computes a digest of the input. This computed digest becomes the new value of the PCR. These calculated hash values may be compared against reference hash values that were previously stored in a secure non-volatile memory of the IHS, such as during factory provisioning of IHS 100. In this manner, a TPM may establish a root-of-trust (RoT) that includes core components of IHS 100 that are validated as operating using instructions that originate from a trusted source. Some TPM PCRs may be used as checksums of log events. The log events are extended in the TPM as the events occur.

Additionally, in various embodiments, such as in accordance with embodiments of the present systems and methods, IHS 100 may include security processor 180 Chipset 125 may provide components of IHS 100 (e.g., processor(s) 105) with access to security processor 180, and/or security processor 180 may integrated into BMC 135 (e.g., as a security co-processor). In various embodiments, security processor 180 may include a chip or core dedicated to providing encryption or other security operations to IHS 100. For example, security processor 180 may include the discussed TPM, configured to securely store encryption keys and measurements that help verify the integrity of IHS 100, and the like. Additionally, or alternatively, a TPM-like architecture of security processor 180 may be integrated into processor(s) 105, BMC 135, storage controller 160, etc. Examples of security processor(s) 180 include, but are not limited to: AMD's PLATFORM SECURITY PROCESSOR (PSP), MICROSOFTS's PLUTON, INTEL's CONVERGED SECURITY AND MANAGEMENT ENGINE (CSME), etc. However, security processor 180, or the like, may be proprietary, with respect to the IHS Original Equipment Manufacturer (OEM).

In some embodiments, security processor 180 may include secure storage, such as NVRAM, and, particularly, in accordance with embodiments of the present systems and methods, registers, such as PCRs, and the like. Security processor 180 may also include a cryptographic processor that supports various cryptographic capabilities. For example, a pre-boot process implemented by security processor 180 may utilize its cryptographic capabilities to calculate hash values that are based on software and/or firmware instructions utilized by certain core components of IHS 100, and in accordance with embodiments of the present systems and methods, non-core components, as discussed in greater detail below. With respect to core components, the calculated hash values may be compared against reference hash values that were previously stored in a secure non-volatile memory, such as during factory provisioning of IHS 100. In this manner, security processor 180 may establish a RoT that includes core components of IHS 100 validated as operating using instructions that originate from a trusted source.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 105 as a systems-on-a-chip (SoC).

A person of skill in the art will appreciate that IHS 100 is merely illustrative and is not intended to limit the scope of the disclosure described herein. In particular, any computer system and/or device may include any combination of hardware, firmware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of skill in the art will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1.

As noted, and as one of skill in the art will appreciate, drift detection is a comparison between a validated baseline and the IHS platform (e.g., server) configuration which includes hardware configuration, firmware, and driver versions. For example, configuration drift may be caused by inconsistent configuration items across the platform. Configuration drift occurs, particularly, when changes to software and hardware are made ad hoc. Drift accounts for many high availability and disaster recovery system failures. Typically, to prevent configuration drift, administrators have maintained detailed information about the network addresses of hardware devices as well as what software versions are running on them, and which updates have been applied.

The Security Protocols and Data Models (SPDM) Working Group standard (e.g., ver.1.2.1 (23 Jun. 2022)), is focused on attesting the hardware, firmware, configuration, etc. of individual components (storage devices, memory modules, etc. . . . ). For OEMs of IHS platforms. As a result, it is challenging to leverage (many) individual attestable components for a consistent platform-level experience, for example where infrastructure solution products (i.e., converged, hyperconverged or infrastructure IHS platforms, or the like) are composed of a large plurality of (e.g., tens of different) SPDM-capable components, from (at times equally) divergent vendors.

In such environments of complex devices (e.g., IHS platforms) comprised of replaceable components, a number of SPDM-related problems may arise. Statically imbedded vendor root certificate authorities (RootCAs) in products, typically have difficulty keeping up all of the hardware and/or software vendor Certificate Authority (CA) life cycle management (e.g., tens of individual CA revocations, additions of new CAs, etc.). Unlike under UEFI standards, in such complex devices comprised of replaceable components, a solution that stands up a single RootCA will not, as discussed below, suffice. Also, in such a complex device environment a customer (i.e., client, IHS platform owner, platform operator, or the like) should be allowed to use any vendor's SPDM-capable component, whether OEM approved or not, and take advantage of SPDM capabilities of that component.

Further, in such complex devices comprised of replaceable components, drift detection, at firmware update time (verifying build time measurement) is not enough to provide comprehensive drift detection coverage. For example, existing drift detection systems and methods do not take advantage of boot-time and runtime measurements. However, the TPM specification "Measured Boot" and PCR model provides superior drift detection (e.g., drift detection incorporating both boot-time and runtime measurements), key sealing, etc.

However, mandating that every component in a platform has a TPM presents a number of issues. Such incorporation would need to be implemented as a standard, which would need to maintain compatibility with multiple vendors, defining a unique-per-component (e.g., per storage device, per embedded NIC (eNIC), per storage controller, per PSU, etc.) additionally such a TPM-usage model would not scale quickly. That is, mandating a TPM in each component would raise cost, layout, board space, and/or similar concerns. For example, installing a discrete TPM for each sub-system, does not scale in cost (need for ~40 TPMs) or space (e.g., hard drives do not have space for a TPM). Moreover, Trusted Computing Group (TCG) approved models typically require months of meetings and updates to arrive at a standards that all IHS, and/or component, OEMs can agree upon. Further, defining a standards-based TPM usage model, per domain, lacks agility. For example, currently, TCG only supports BMC, server host and client host.

Figure 2:
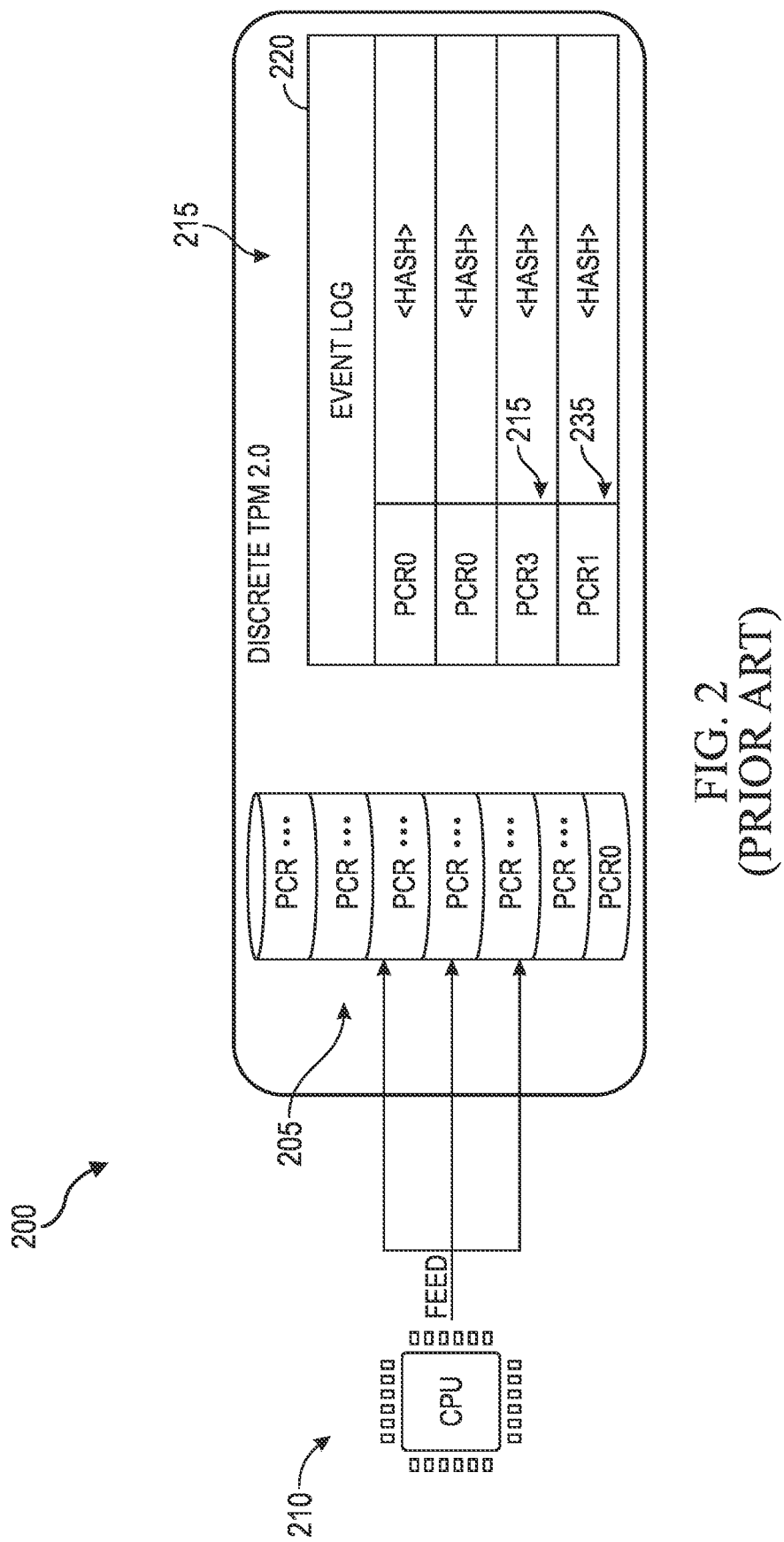
FIG. 2 is a block diagram illustrating existing operation of a Trusted Platform Module (TPM).

Additionally, TPM models only work with a single direct-attached CPU (i.e., a one-to-one model). FIG. 2 is a block diagram illustrating existing operation of TPM 200 showing feed of PCRs 205 from single CPU 210 for creation of event log 215. That is, TPM 200 may utilize its cryptographic capabilities to calculate hash values 220 for PCRs 205 as they are feed from single CPU 210. These calculated hash values may then be used to create event log 215 detailing the addition of the components to the IHS. However, hardware disaggregation trends (e.g., Data Center Modular Hardware System (DC-MHS)) may employ a single TPM modular component, which may have multiple CPUs. Thus, in accordance with embodiments of the present systems and methods, it may be desirable to report singular cohesive drift detection of many CPUs (e.g., in a one-to-many model). For example, presenting a detection of drift based on a Datacenter Secure Control Module (DC-SCM) Field Replaceable Unit (FRU), regardless of the number of CPUs on the card, enables a customer to be able to replace this whole DC-SCM card to address such drift. While a component-integrated TPM (i.e., not a discrete TPM) would address many such issues, a fully TPM 2.0 compliant implementation is problematic for silicon vendors to integrate.

Furthermore, even if an IHS OEM were to have a way method to ensure constant latest update Vendor CA ("over the air"), this would not support channel devices, as the vendor CAs would only encompass OEM vendors (i.e., vendors that that the OEM knows about). A customer may expect to be able to buy a component from any vendor, plug the component into the OEM's IHS platform and for the component to work.

Additionally, software build time (one-time) measurements, do not equate to (many) boot-time and runtime measurements. As discussed in greater detail below, embodiments of the present systems and methods provide drift detection on boot-time and/or runtime measurements, not just at build time or firmware update time.

The above problems are compounded by wide differences in vendor implementation of SPDM measurement. Some vendors use TCG Device Identifier Composition Engine (DICE) implementations, some support hardware measurements only, some support hardware plus firmware measurements, in some situations configuration and hardware cannot be determined at built time, etc.

Embodiments of the present systems and methods for drift detection in complex IHS platforms comprised of replaceable components make use of ROT measurement, such as PCR functionality, for drift detection, as well as attestation. However, such PCR functionality is variously standardized. For example, the "TCG Server Management Domain Firmware Profile Specification" provides PCR standards for server BMC TPMs. while the "TCG PC Client Platform Firmware Profile Specification" provides PCR standards for personal computers, and the like. Embodiments the present systems and methods for drift detection in complex IHS platforms comprised of replaceable components develop a hieratical structure of virtualized PCRs to encompass changes in IHS platform hardware, firmware, and/or configuration, so as to provide drift detection with any measurement model.

As discussed in greater detail below, various embodiments of the present systems and methods are based on two components, which may be provided by the IHS OEM, security processor 180, or the like, which establishes a platform-level ROT, and an aggregation engine, which may be the IHS BMC 135, a host process carried out by IHS CPU(s) (105) (which may be referred to herein as "the host"), and/or the like.

In accordance with embodiments of the present systems and methods, security processor 180, or the like, presents a number of hieratical sets of PCRs, referred to herein as Virtualized PCR Engines (VPEs), which can be more tailored to the platform hardware, sub-domains, CPUs, and the like. In contrast, employing a TPM in every subdomain (e.g., in each component) would only address that single subdomain, and would not relate between the subdomains in the manner provided by the hieratical nature of the present VPEs.

The aggregation engine, in accordance with embodiments of the present systems and methods, collects (over SPDM) and directly (e.g., via Serial Peripheral Interconnect (SPI), via Inter-Integrated Circuit (I2C), etc.) measure all various components and populate the VPE PCRs as needed. As the centralized collection control point, the aggregation engine is responsible for the maintaining of a wholistic platform level "VPE/PCR event log" from sub-domains in the platform.

Use of these VPEs allows vendor CA certificates to be collected directly from components and not require the vendor CA certificates be statically held by (OEM) (security management) software. This also addresses statically imbedding vendor RootCAs into products, which may present difficulty maintaining all of the vendor CA life cycle management (e.g., tens of individual CA revocations, addition of new ones, etc.), as discussed above.

The vendor CA certificates can then, in accordance with embodiments of the present systems and methods, be fed into the PCRs themselves, allowing drift detection of vendors CA certificates, as well as measurements provided by the vendor's component in accordance herewith. As VPEs can be defined for slots (such as, PCIe, and USB), in accordance with embodiments of the present systems and methods, a customer may "bring their own device," and so long as the device supports SPDM, the aggregation engine can properly, independently populate the PCRS. This allows a customer to use any vendor's SPDM-capable component, whether OEM-approved or not, and take advantage of the SPDM capabilities.

Usage of an OEM-per-platform definable VPEs hierarchy structure in accordance with embodiments of the present systems and methods enables drift detection at boot-time for hardware, firmware, configuration and vendor CA Certificates, and runtime and/or component OS measurement(s). This enables drift detection, not only at firmware update time to verify build time measurement, but also provides comprehensive coverage drift detection that takes advantage of boot-time and runtime measurements as well, comparable to TPM specification Measured Boot and PCR models, such as discussed above, but implemented for compressive drift detection in a complex IHS platform comprised of a plurality of (customer) replaceable components. Additionally, this use of an OEM-per-platform definable VPEs hierarchy structure enables an IHS (platform) OEM to quickly adapt and define (a) VPE/PCR hierarch(y)(ies) as part of "IHS/platform enablement," under embodiments of the present systems and methods, and not rely on standards being formulated, first.

Embodiments of the present systems and methods implement VPEs as virtualized by an existing security processor (180) (i.e., providing a security processor-based "Platform RoT" (PROT)). That is, an enterprise product (e.g., an IHS platform) may have many RoTs (e.g., many security processors, security coprocessors, security processors or the like integrated into SoCs, etc.). However, embodiments of the present systems and methods make use of a "top" security processor (e.g., and OEM IHS-integrated security processor (180)) as a PROT. Since embodiments of the present systems and methods implement VPEs as virtualized by an existing security processor, embodiments of the present systems and methods add little or no cost burden, and no space burden. Thereby, cost and layout/board space concerns about mandating TPM throughout platform components can be alleviated, and difficulties in integrating a TPM into platform components as customizable-per-silicon behaviors can be avoided, in that, in embodiments of the present systems and methods, ROT measurement(s) and PCR functionality are employed.

Since, in accordance with embodiments of the present systems and methods, VPEs can be defined on subsystems, or per FRU, singular cohesive drift detection of many CPUs (one-to-Many Model) is provided under embodiments of the present systems and methods, as the FRU/subsystem VPE (i.e., a card) can be fed by multiple layers of VPEs downstream (e.g., additional attached cards, or CPUs).

Figure 3:
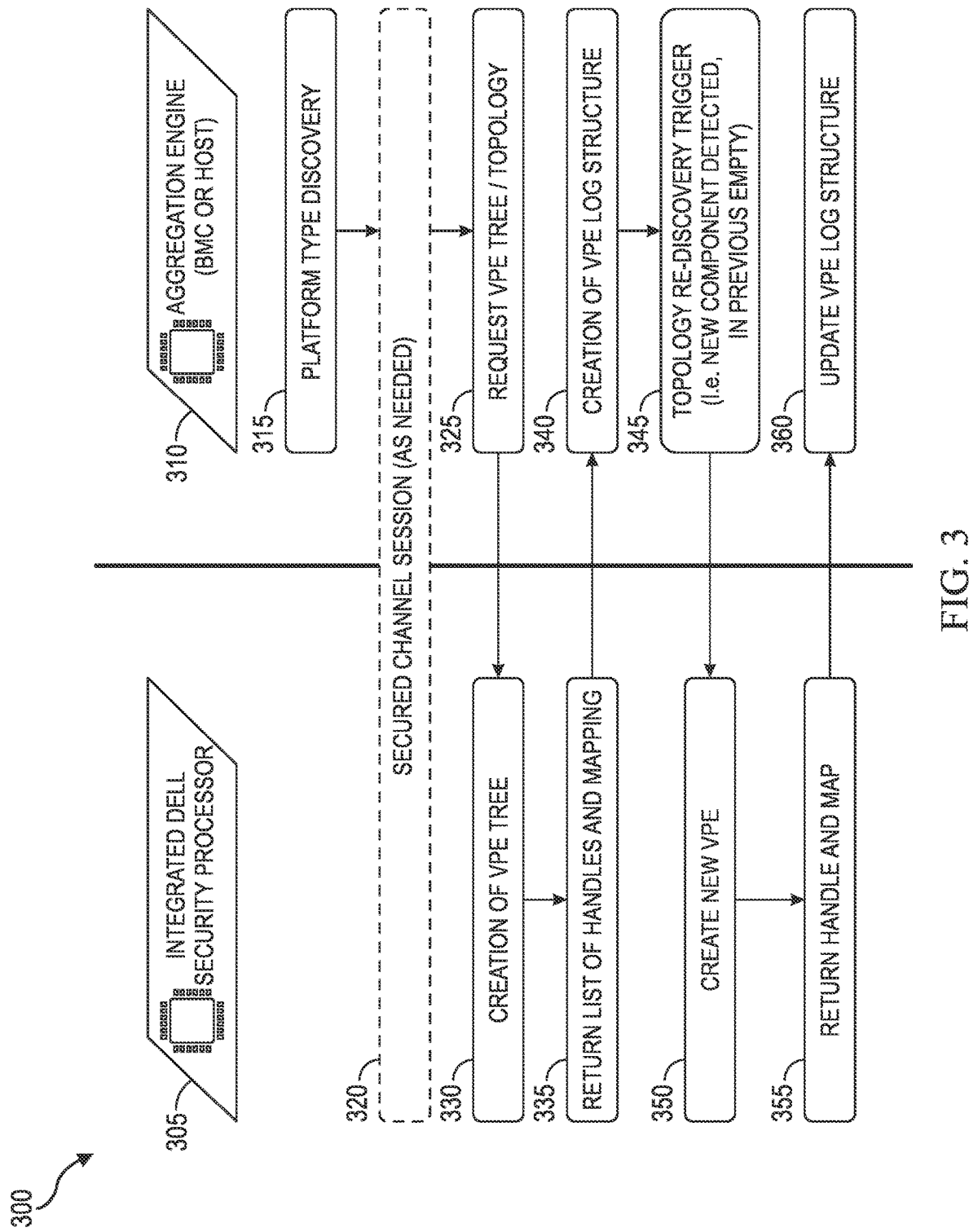
FIG. 3 is a flow diagram of an example process for drift detection in complex IHS platforms comprised of replaceable components, according to some embodiments.

FIG. 3 is a flow diagram of example process 300 for drift detection in complex IHS platforms comprised of replaceable components, according to some embodiments. As noted, various embodiments of the present systems and methods are based on two components, which may be provided by the IHS OEM, security processor 305 (180), or the like, which establishes a platform-level ROT, and aggregation engine 310, which may be the IHS BMC 135, a host process carried out by IHS CPU(s) (105) (the host), and/or the like.

In process 300, aggregation engine 310, discovers the IHS platform type, at 315, and at 320, the aggregation engine and/or the security processor 305 (180) of the IHS (100) may, according to some embodiments, establish a secure channel session among the aggregation engine, the security processor and/or one or more components in the IHS platform. At 325, aggregation engine 310 requests a VPE tree and/or topology from security processor 305.

At 330 security processor 305 creates the requested VPE tree of the IHS, to return a list of handles and mapping of IHS platform components to aggregation engine 310, at 335.

Herein, "handles" are used, in accordance with embodiments of the present systems and methods, to keep track of VPEs. For example, if an implementation of the present systems and methods has ten VPE/PCRs, ten different handles may be employed in accordance with embodiments of the present systems and methods. So, when aggregation engine 310 requests an update to a VPE/PCR (such as discussed below with respect to FIG. 4), the aggregation engine can specify to security processor 305 the handle of the VPE/PCRs to update.

At 340, aggregation engine 310 creates a VPE log structure, based on the list of handles and mapping of IHS platform components from 335. At 345, such as, in response to detection, by aggregation engine 310, of a new component in the IHS platform, a topology rediscovery trigger is sent to security processor 305. With respect to topology rediscovery, components may usually be added to the platform when the host IHS is turned off, as such, host power on would be a trigger for rediscovery, in accordance herewith. However, for "hot plug" devices, such as an SD card, USB devices, or the like, a rediscovery may be initiated (i.e., triggered) on the hot-plug event.

At 350, security processor 305, creates a new VPE, in response to the rediscovery trigger at 345 from aggregation engine 310, and at 355 security processor 305 returns, to the aggregation engine, a handle and map of the new VPE of the new platform component. Then, at 360, aggregation engine 310 updates the VPE log structure, based on the handle and map of the new VPE of the new platform component.

Figure 4:
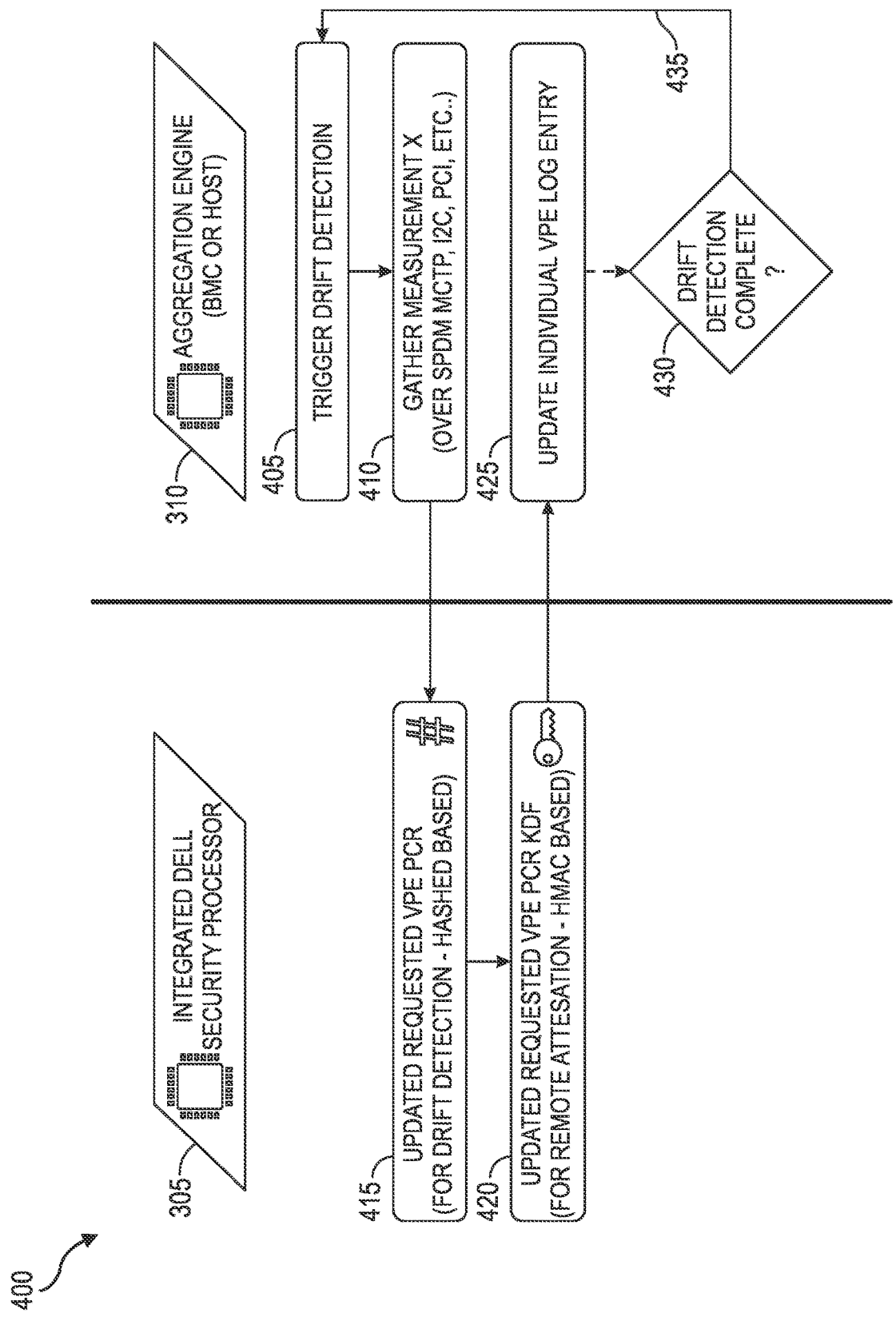
FIG. 4 is a flow diagram of an example process for each measurement in drift detection for complex IHS platforms comprised of replaceable components, according to some embodiments.

FIG. 4 is a flow diagram of example process 400 for each measurement in drift detection for complex IHS platforms comprised of replaceable components, according to some embodiments. Therein, in response to a trigger of drift detection at 405, aggregation engine 310 (IHS BMC 135, the host, or the like) gathers (a) measurement(s) from each of one or more components in the IHS at 410, and provides the one or more measurements to security processor 305 (180) of the IHS. 7. The one or more measurements from each of the components in the IHS may be gathered at 410 indirectly from SPDM(s) of a respective component and/or gathered directly, such as via Management Component Transport Protocol (MCTP), I2C, PCIe, SPI and/or the like. MCTP is a protocol designed by the Distributed Management Task Force (DMTF) to support communications between different intelligent hardware components that make up a platform management subsystem, providing monitoring and control functions inside a managed computer system. This protocol is independent of the underlying physical bus properties, as well as the data link layer messaging used on the bus. MCTP's underlying buses include I2C, serial links, PCIe and USB. Simplified nature of the protocol and reduced encapsulation overheads make MCTP suitable for implementation and processing within system firmware and integrated BMCs on a wide range of platforms, including servers.

At 415, security processor 305 updates a requested VPE PCR, and/or, at 420, updates requested VPE PCR Key Derivation Function (KDF) for provisioning to the aggregation engine. The updating of the requested VPE PCR at 415 may be carried out for hashed-based drift detection and/or the updating the requested VPE PCR KDF may be carried out for hash-based message authentication code (HMAC) based remote attestation of one or more components in the IHS. At 425, the aggregation engine updates an individual VPE log entry of the VPE log structure, based on the updated requested VPE PCR from 415 and/or the updated requested VPE PCR KDF from 420.

At 430, aggregation engine 310 may determine if the triggered draft detection is complete, and in response to a determination that the triggered draft detection is not complete, repeat (via 435) gathering of one or more measurements from each of one or more components in the IHS at 410 to be provided to security processor 305, updating the requested VPE PCR and/or VPE PCR KDF, at 415 and 420, respectively, and updating the VPE log entry at 425. While VPE PCR KDFs may not be appropriate for use as all VPEs in embodiments of the present systems and methods, VPE PCR KDFs may be used for (a) top level comprehensive VPE(s), but could also be applied to targeted subdomains, such as DC-SCM.

Figure 5:
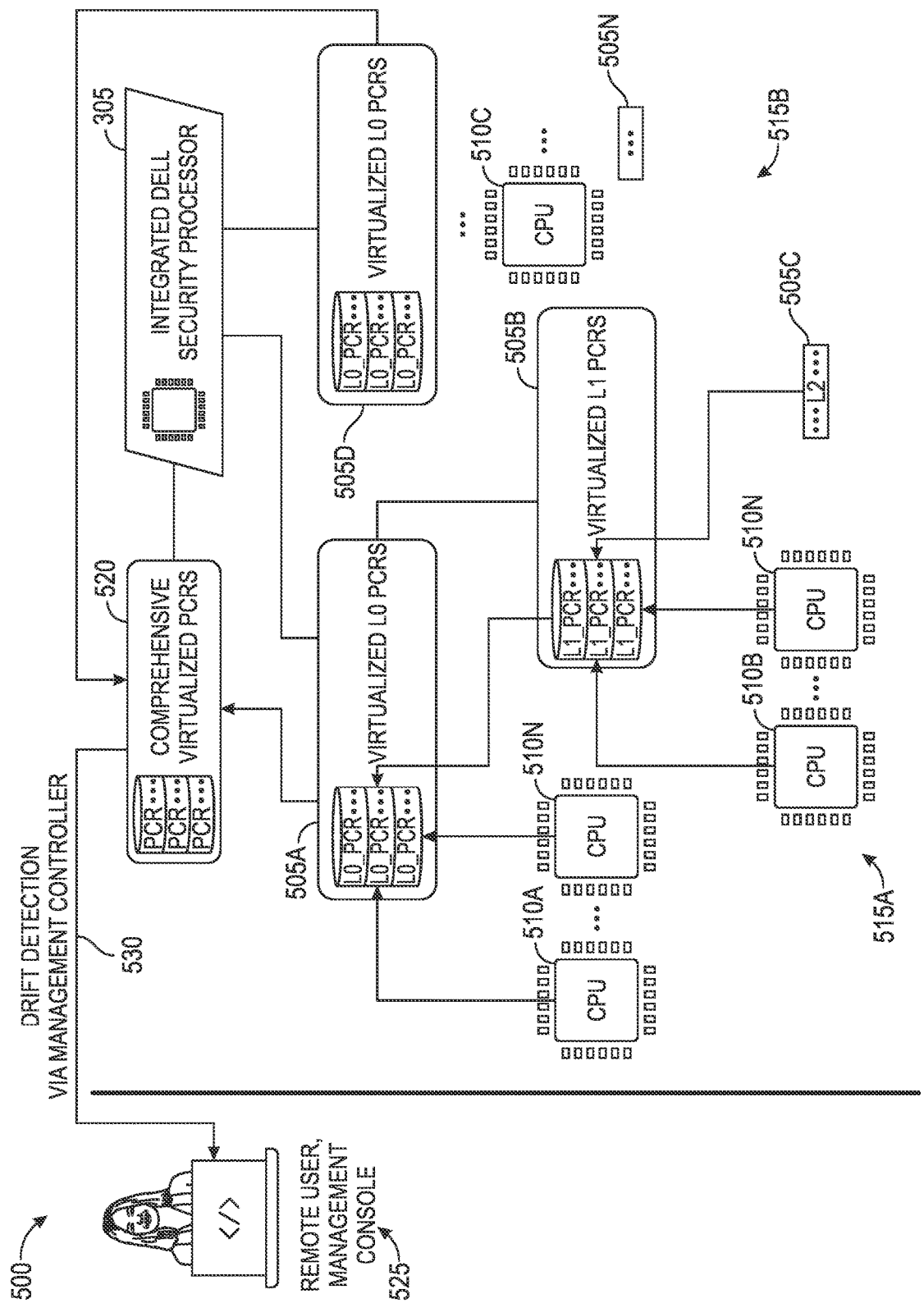
FIG. 5 is a block diagram illustrating an overview of implementation of systems and methods to support drift detection in complex IHS platforms comprised of replaceable components, according to some embodiments.
Figure 7A:
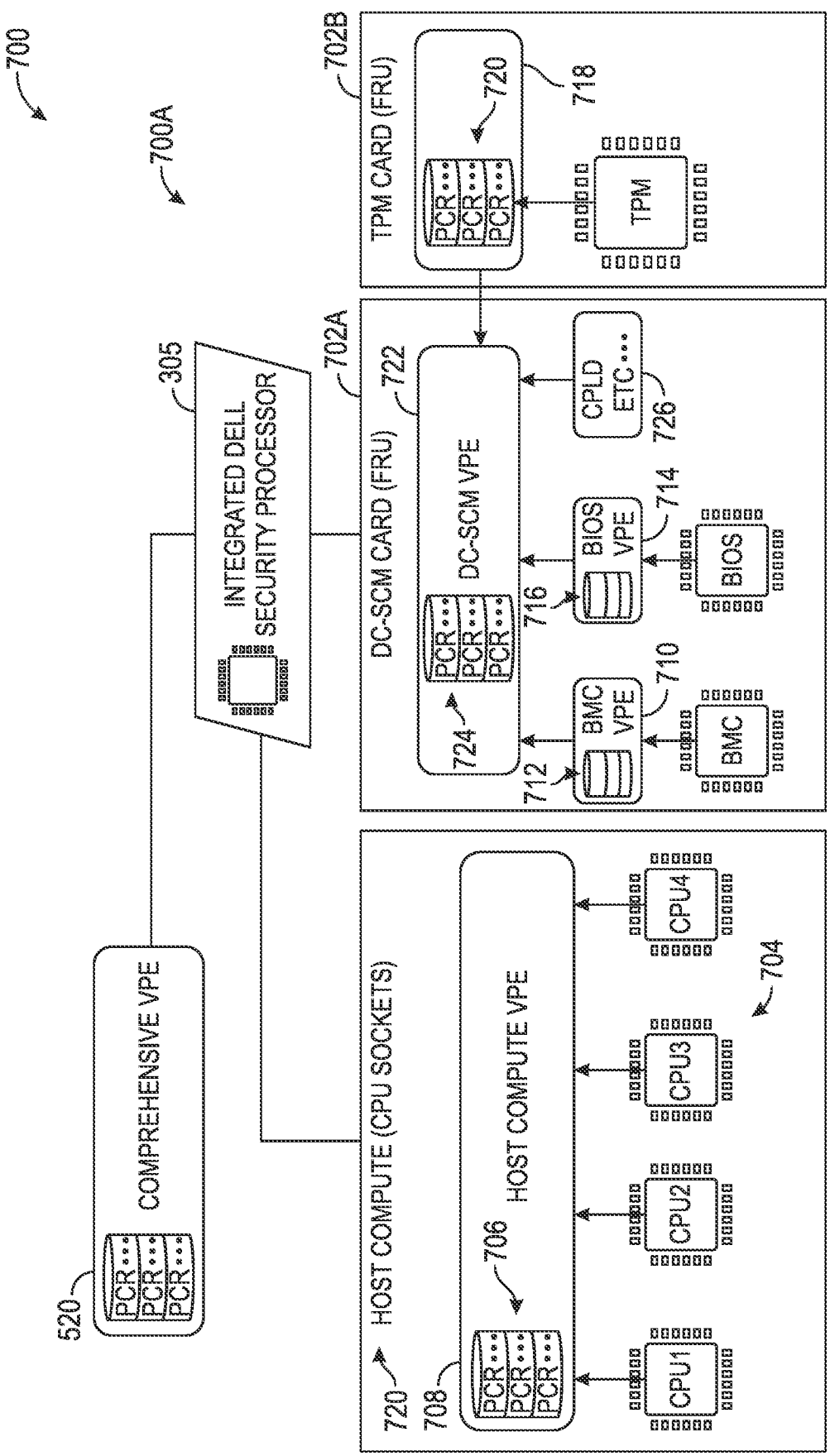
FIGS. 7A and 7B are block diagrams illustrating implementation of drift detection in portions of a complex IHS platform comprised of replaceable components, according to some embodiments.

FIG. 5 is a block diagram illustrating overview 500 of implementation of systems and methods to support drift detection in complex IHS platforms comprised of replaceable components, according to some embodiments. Therein, an embodiment of the present systems and methods, which are based on a platform ROT (e.g., IHS-integrated security processor 305), which as an overall ROT the product is able to present VPEs 505a-n for all CPUs 510a-n and subdomains 515a-n in the product (as needed). Such as described above, each VPE is a small subset of TPM-like functionality, modified in accordance with embodiments of the present systems and methods, to support drift detection. The illustrated hieratical nature allows PCRs (such as PCRs for component hardware, firmware (software), and configuration) from CPUs (e.g., 510a-n) to feed into a VPE (e.g., 505c), and in turn, to feed into (further) VPEs (e.g., 505b and c), allowing embodiments of the present systems and methods to accurately reflect composable and replaceable (FRU) hardware elements. Ultimately, the VPEs feed into a comprehensive VPE 520 for provisioning to a remote user, management console 525, or the like, as drift detection 530, via a management controller (e.g., BMC 135). FIGS. 7A and B, described below, show an example an embodiment of the present systems and method, such as illustrated in FIG. 5, deployed in conjunction with modular IHS (server) hardware components.

Figure 6:
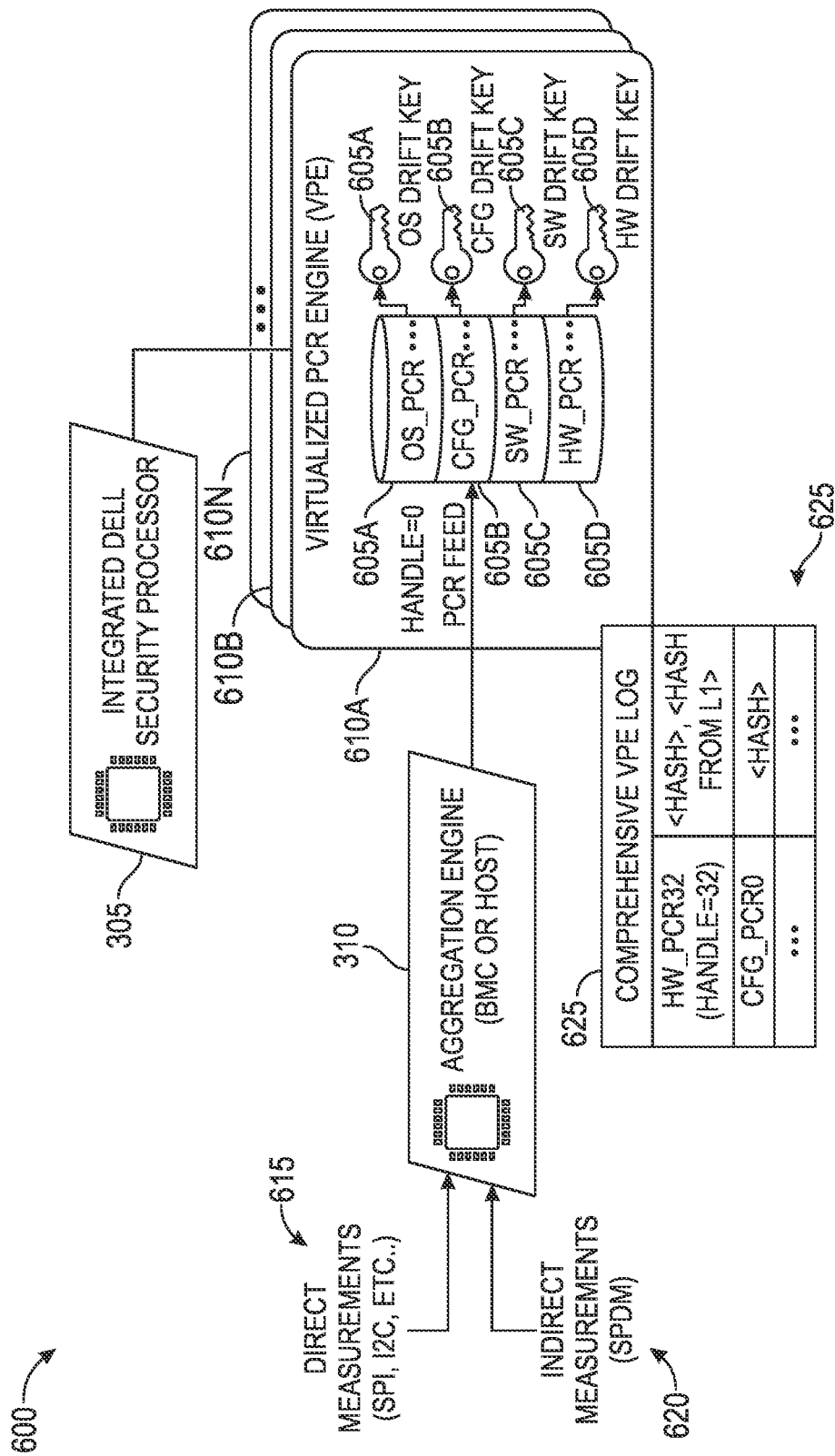
FIG. 6 is a block diagram illustrating implementation of drift detection in complex IHS platforms comprised of replaceable components using an IHS security processor and aggregation engine, according to some embodiments.

FIG. 6 is a block diagram illustrating implementation 600 of drift detection in complex IHS platforms comprised of replaceable components using IHS security processor 305 and aggregation engine 310, according to some embodiments. Therein, IHS security processor 305 (180), which, in accordance with embodiments of the present systems and methods, is used to provide a platform ROT, is configured to present a number of hieratical sets of PCRs 605a-n, as VPEs 610a-n corresponding to IHS platform hardware, sub-domains, CPUs, etc.

Whereas, aggregation engine 310 (e.g., BMC 135 or the above-discussed host) is configured to collect measure(s) 615 and 620 of IHS platform components, populate PCRs 605a-n of VPEs 610a-n, and maintain IHS platform level VPE and PCR event log 625 from sub-domains of the IHS platform. In a server IHS example, direct measurements 615 may include, include BIOS SPI flashes, Complex Programmable Logic Devices (CPLDs) via Joint Test Action Group (JTAG) standards and/or bit banging, embedded NIC and/or LAN on Motherboard (LOMS) over I2C, etc., such as discussed above. In any such case, aggregation engine 310 may directly access the platform component device and measure it itself. Indirect measurements 620 by aggregation engine 310 may be taken, by way of example, from a server RAID controller, which the BMC (and/or RAC), or the like will send SPDM commands, to request its measurements. Aggregation engine 310 is also responsible for feeding VPE PCRs 605a-n, and recording the events in VPE log 625. This allows the RoT, security processor 305 to only support the VPEs 610a-n, both presenting the PCRs 605a-n, as well as the VPEs 610a-n corresponding to IHS platform hardware, sub-domains, CPUs, etc., as discussed above.

The RoT, security processor 305, can also generate KDF keys 630a-n off of PCRs 605a-n to provide remote attestation (of drift) capability, for example if a remote entity (525) elects to ensure the VPE log matches a current attestable drift state.

Figure 7B:
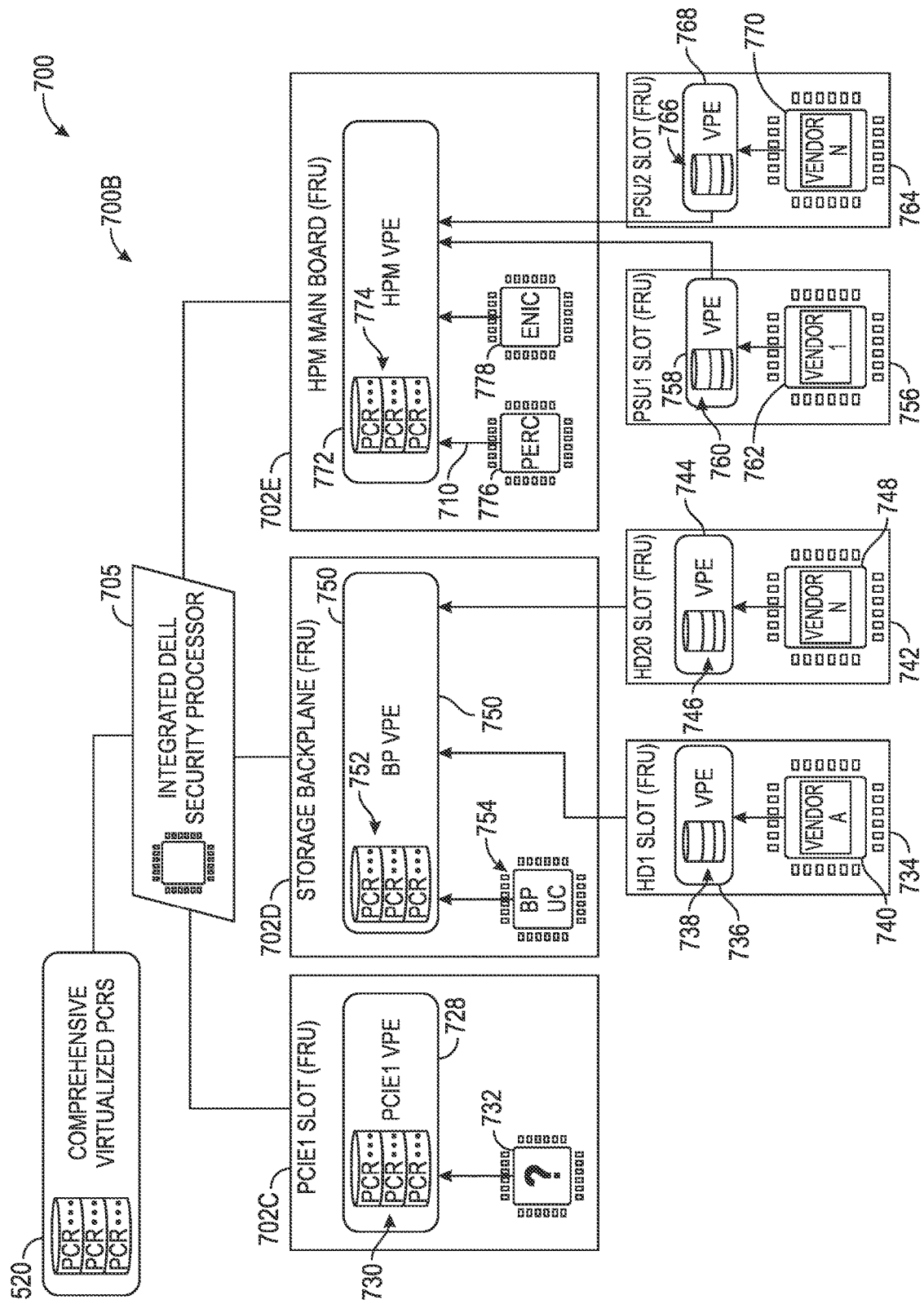

FIGS. 7A and 7B are block diagrams illustrating implementation of drift detection in portions 700a and 700b of complex IHS platform 700 comprised of replaceable components 702a-n, according to some embodiments. Therein, host compute (CPU 105 sockets) 704 PCRs 706 (e.g., "measurements," such as a CPU unique identity, such as may be assigned by the CPU's manufacturer) are used to create, and/or update, host compute VPE 708, such as in the (various) manner(s) described above. In various embodiments, a single host compute VPE 708 may be created and/or updated, to be used to create and/or update comprehensive VPE 520. For example, if the CPUs are replaced together, a single host compute VPE may be employed, in accordance with various embodiments of the present systems and methods. Additionally, or alternatively, a number of individual VPEs (708), each corresponding to one of the CPUs (sockets) (704), for example, in the illustrated embodiment, four individual VPEs may be created and/or updated, to be used to create and/or update comprehensive VPE 520.

With respect to DC-SCM (FRU) card 702a, BMC VPE 710 may be created and/or updated using BMC PCRs 712, and BIOS VPE 714 may be created and/or updated using BIOS PCRs 716, in the (various) manner(s) discussed above. With respect to TPM (FRU) card 702b, TPM VPE 718 may be created and/or updated using TPM PCRs 720, in the (various) manner(s) discussed above. Example TPM measurements that may be used to derive TPM PCRs 720 may include, by way of example, an EK, an Initial Device Identifier (iDevID), Secure Configuration Verification (SCV) key, etc. DC-SCM VPE 722, comprising PCRs 724, may be created and/or updated using BMC VPE 710, BIOS VPE 714, TPM VPE 718, PCRs derived from CPLD 726 measurements (etc.), in the (various) manner(s) discussed above, to be used to create and/or update comprehensive VPE 520.

Turning now to FIG. 7B, PCIe1 Slot 702c VPE 728 may be created and/or updated using PCRs 730 gathered from and/or derived from measurements from card 732, in the (various) manner(s) discussed above, to be used to create and/or update comprehensive VPE 520. Any PCIe card that supports the SPDM standard(s) may be used in accordance with embodiments of the present systems and methods, whether they be IHS OEM supported cards, channel supported cards, or the like.

With respect to storage Back Plane (BP) FRU 702d, storage device slot 734 VPE 736 may be created and/or updated using storage device PCRs 738 gathered from FRU storage device 740, in the (various) manner(s) discussed above, etc. Such that, likewise, storage device slot 742 VPE 744 may be created and/or updated using storage device PCRs 746 gathered from FRU storage device 748, in the (various) manner(s) discussed above. In turn, BP VPE 750, comprising PCRs 752, may be created and/or updated using PCRs from, or PCRs derived from measurements from, BP microprocessor 754, storage device 740 VPE 736, storage device 748 VPE 744 (etc.), in the (various) manner(s) discussed above, to be used to create and/or update comprehensive VPE 520.

With respect to Host Processor Module (HPM) FRU 702e, PSU slot 756 VPE 758 may be created and/or updated using PSU PCRs 760 gathered from FRU PSU 762, in the (various) manner(s) discussed above. Likewise, PSU slot 764 VPE 766 may be created and/or updated using PSU PCRs 768 gathered from FRU PSU 770, in the (various) manner(s) discussed above. In turn, HPM VPE 772, comprising PCRs 774, may be created and/or updated using PCRs from, or PCRs derived from measurements from, server RAID controller 776 and/or eNIC 778, PSU slot 756 VPE 758, PSU slot 764 VPE 766 (etc.), in the (various) manner(s) discussed above, to be used to create and/or update comprehensive VPE 520.

Figure 8:
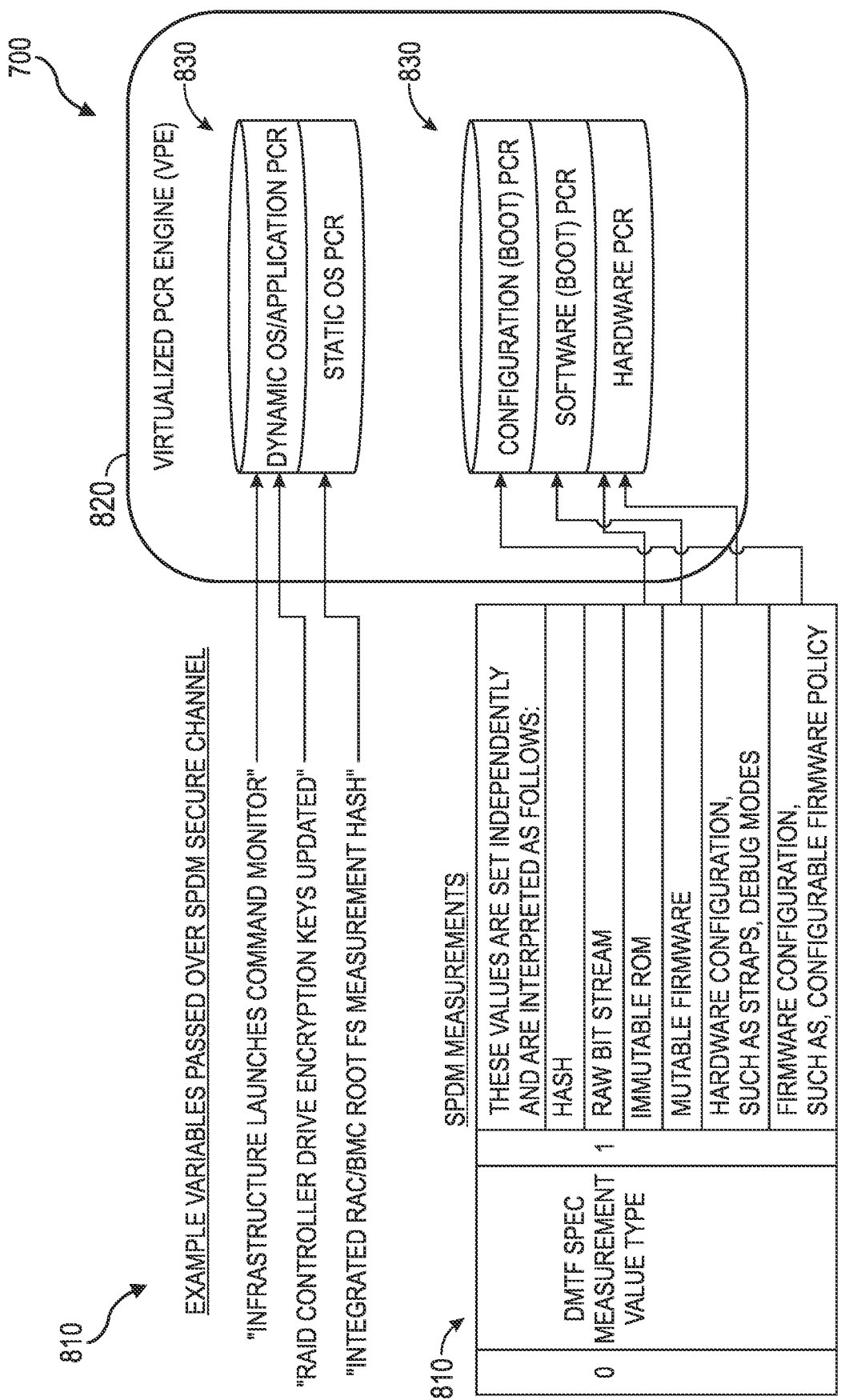
FIG. 8 is a block diagram illustrating Security Protocols and Data Models (SPDM)—to—Virtualized Platform Configuration Register Engine (VPE) mapping, according to some embodiments.

FIG. 8 is a block diagram illustrating mapping 800 of SPDM 810—to—VPE 820 PCRs 830a-n mapping, according to some embodiments. Secure Channel (Schannel) (320) is not required for these use cases. However, as noted, the current trend is for SPDM measurements to be focused on boot-time measurements. If a component manufacturer supports runtime measurements under "Mutable Firmware," or the like, hashes do not have to be passed explicitly over Secure Channel (320).

In accordance with the foregoing, drift detection can be provided throughout the IHS platform. For example, in a remote user management console (525), a comprehensive VPE (520) may be used to address concerns that something in the IHS platform has changed (hardware, software, configuration, or the like) and that it was not supposed to. In another example a RAC (Remote Access Controller) VPE (710) may be used to indicate, on the remote user management console, a version of RAC firmware currently being run. A compute VPE (708) may be used to present, on the remote user management console, a warning that something has changed in the IHS platform CPU(s), and that this could be a sign a CPU going bad. In further examples, an installed component (e.g., a GPU card) not supported by the IHS OEM that is customer-installed in an IHS that has a secure boot configuration enabled may result in drift detection pointing to a PCIe VPE (728) to indicate a conflict, or the like. An indication that something has changed in a storage drive slot, and that a storage drive in the slot is going bad may rely on and storage slot VPE (736, 744, or the like). In a non-boot-time example of dynamic drift detection in accordance with embodiments of the present systems and methods a RAC (BMC 135) may pass a server RAID controller a drive EK from an external key server. Therein, a server RAID controller VPE and/or RAC VPE (BMC VPE 712) may indicate that that the drive EK has been received from the external key server and that the server RAID controller configuration has not changed, in response to a customer inquiring why a IHS platform with centralized, scalable server key management is not working.

Also, in accordance with the foregoing, a user use case, with respect to drift detection may be that a remote user, via a management console of the like may invoke remote drift detection, such as by asking to know, with strong cryptographic assurance, what has happened historically for a particular HIS platform component. As a result, an IHS platform management controller (e.g., BMC 135, or the above-discussed host) may, in accordance with embodiments of the present systems and methods, return a resultingly requested VPE log (625). In another user use case with respect to drift detection a remote user, via a management console of the like may invoke remote attestation of drift, such as by asking to know, with strong cryptographic assurance, what the current state of drift is for a particular HIS platform component. As a result, the IHS platform management controller may, in accordance with embodiments of the present systems and methods, provide proof of possession, against (a) key(s) derived from appropriate VPE/PCRs, such as (a) private key(s) held by the security processor (platform ROT) (or other IHS integrated digital security processor).

In accordance with the foregoing, embodiments of the present systems and methods utilize an IHS platform's overall security processor, as a platform RoT, to present virtualized subset of TPM-like functionality to multiple sub-domains and CPUs within the IHS platform. Hieratical representation of PCRs through VPE can accurately map to composable and disaggregated hardware, such embodiments. (A) centralized singular aggregation engine (BMC or host) is, therein, responsible for gathering and feeding VPE and PCRs and maintaining cohesiveness of the whole VPE tree (all layers of VPE). This differs from TPM model, where the CPU is responsible for feeding PCRs.

Thereby, embodiments of the present systems and methods can expand to more traditional TPM functionality reliant on PCRs (e.g., sub-domains can seal their keys in PROT). Also, embodiments of the present systems and methods enable plug-and-play by highly interoperable use with existing standards (SPDM, DICE, TPM, etc.) Further, embodiments of the present systems and methods supports both drift detection, and remote attestation of drift. Additionally, embodiments of the present systems and methods provide drift detection in complex IHS platforms comprised of replaceable components with cost effective scalability.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of Machine Learning (ML) software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

The VPE logs (e.g., PCR hash values) could be used, in accordance with embodiments of the present systems and methods, to train ML models, including Artificial Intelligence (AI) models, about customer expected and/or unexpected changes in drift. As used herein, ML refers to one or more algorithms that implement: a neural network (e.g., artificial neural network, deep neural network, convolutional neural network, recurrent neural network, autoencoders, reinforcement learning, etc.), fuzzy logic, AI, deep learning, deep structured learning hierarchical learning, support vector machine (SVM) (e.g., linear SVM, nonlinear SVM, SVM regression, etc.), decision tree learning (e.g., classification and regression tree or "CART"), Very Fast Decision Tree (VFDT), ensemble methods (e.g., ensemble learning, Random Forests, Bagging and Pasting, Patches and Subspaces, Boosting, Stacking, etc.), dimensionality reduction (e.g., Projection, Manifold Learning, Principal Components Analysis, etc.), or the like.

Non-limiting examples of publicly available ML algorithms, software, and libraries that may be utilized within embodiments of systems and methods described herein include, but are not limited to: PYTHON, OPENCV, INCEPTION, THEANO, TORCH, PYTORCH, PYLEARN2, NUMPY, BLOCKS, TENSORFLOW, MXNET, CAFFE, LASAGNE, KERAS, CHAINER, MATLAB Deep Learning, CNTK, MatConvNet (a MATLAB toolbox implementing convolutional neural networks for computer vision applications), DeepLearnToolbox (a Matlab toolbox for Deep Learning from Rasmus Berg Palm), BigDL, Cuda-Convnet (a fast C++/CUDA implementation of convolutional or feed-forward neural networks), Deep Belief Networks, RNNLM, RNNLIB-RNNLIB, matrbm, deeplearning4j, Eblearn.lsh, deepmat, MShadow, Matplotlib, SciPy, CXXNET, Nengo-Nengo, Eblearn, cudamat, Gnumpy, 3-way factored RBM and mcRBM, mPoT, ConvNet, ELEKTRONN, OpenNN, NEURALDESIGNER, Theano Generalized Hebbian Learning, Apache SINGA, Lightnet, and SimpleDNN."

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:
1. A method comprising:
performing, by an aggregation engine, discovery of an information handling system (IHS) platform type;
requesting, by the aggregation engine, a virtualized platform configuration register engine tree and/or topology from a security processor of the IHS;
creating, by the security processor, the virtualized platform configuration register engine tree of the IHS platform, to return a list of handles and mapping of IHS platform components to the aggregation engine;
creating, by the aggregation engine, a virtualized platform configuration register engine log structure, based on the list of handles and mapping of IHS platform components;
sending, by the aggregation engine, in response to detection of a new component in the IHS platform by the aggregation engine, a topology rediscovery trigger to the security processor;

creating, by the security processor, in response to the trigger, a new virtualized platform configuration register engine;

returning, by the security processor, to the aggregation engine, a handle and map of the new virtualized platform configuration register engine; and updating, by the aggregation engine, the virtualized platform configuration register engine log structure, based on the handle and map of the new virtualized platform configuration register engine.

2. The method of claim 1, further comprising establishing, by the aggregation engine and/or the security processor, a secure channel session among the aggregation engine, the security processor and/or one or more components in the IHS.

3. The method of claim 1, further comprising, in response to a trigger of drift detection:

gathering, by the aggregation engine, one or more measurements from each of one or more components in the IHS, and providing the one or more measurements to the security processor;

updating, by the security processor, a requested virtualized platform configuration register engine platform configuration register, and/or updating, by the security processor, a requested virtualized platform configuration register engine platform configuration register key derivation function; and updating, by the aggregation engine, a virtualized platform configuration register engine log entry of the virtualized platform configuration register engine log structure, based on the updated requested virtualized platform configuration register engine platform configuration register and/or the updated requested virtualized platform configuration register engine platform configuration register key derivation function.

4. The method of claim 3, further comprising, determining if the triggered draft detection is complete and in response to a determination that the triggered draft detection is not complete repeating the gathering of one or more measurements from each of one or more components in the IHS, providing the one or more measurements to the security processor, updating the requested virtualized platform configuration register engine platform configuration register and/or updating the requested virtualized platform configuration register engine platform configuration register key derivation function, and updating the virtualized platform configuration register engine log entry.

5. The method of claim 3, wherein updating the requested virtualized platform configuration register engine platform configuration register is carried out for hashed-based drift detection.

6. The method of claim 3, wherein updating the requested virtualized platform configuration register engine platform configuration register key derivation function is carried out for hash-based message authentication code based remote attestation.

7. The method of claim 3, wherein the one or more measurements from each of the one or more components in the IHS is gathered indirectly from Security Protocols and Data Models (SPDM) of a respective component.

8. The method of claim 3, wherein the one or more measurements from each of the one or more components in the IHS is gathered directly via Management Component Transport Protocol (MCTP), Inter-Integrated Circuit (I2C), Peripheral Component Interconnect Express (PCIe) and/or via Serial Peripheral Interconnect (SPI).

9. The method of claim 1, wherein the aggregation engine is a baseboard management controller of the IHS and/or a host process carried out by a central processing unit of the IHS.

10. An information handling system (IHS) comprising:

a security processor configured to present a number of hierarchal sets of platform configuration registers, as virtualized platform configuration register engines corresponding to IHS platform hardware, sub-domains, and/or central processing units; and an aggregation engine configured to:

collect measure of IHS platform components;

populate the platform configuration registers of the virtualized platform configuration register engines; and maintain an IHS platform level virtualized platform configuration register engine and platform configuration register event log from sub-domains of the IHS platform.

11. The IHS of claim 10, wherein the aggregation engine is a baseboard management controller of the IHS and/or a host process carried out by a central processing unit of the IHS.

12. The IHS of claim 10, wherein the aggregation engine is further configured to collect the measure of IHS components indirectly from Security Protocols and Data Models (SPDM) of the respective component.

13. The IHS of claim 10, wherein the aggregation engine is further configured to collect the measure of IHS components directly over Management Component Transport Protocol (MCTP), Inter-Integrated Circuit (I2C), Peripheral Component Interconnect Express (PCIe) and/or via Serial Peripheral Interconnect (SPI).

14. The IHS of claim 10, wherein collection of measure of IHS components comprises collection of vendor certificate authority (CA) certificates from the IHS components, and wherein populating the platform configuration registers of the virtualized platform configuration register engines further comprises feeding the certificates into the platform configuration registers, enabling drift detection of the vendor CA certificates and measurement of the IHS component.

15. The IHS of claim 10, wherein the virtualized platform configuration register engines are defined for IHS slots.

16. The IHS of claim 10, wherein the virtualized platform configuration register engine hierarchal structure enables hardware drift detection, firmware drift detection, IHS configuration drift detection and/or vendor CA certificate drift detection at boot-time and/or component operating system (OS) measurement during runtime.

17. The IHS of claim 10, wherein the virtualized platform configuration register engines are defined on subsystems and/or per field replaceable unit.

18. A non-transitory computer readable medium having program instructions stored thereon that, upon execution by an information handling system (IHS), cause:

an aggregation engine of the IHS to discover a platform type;

the aggregation engine to request a virtualized platform configuration register engine tree and/or topology from a security processor of the IHS;

the security processor to create the virtualized platform configuration register engine tree for the IHS, to return a list of handles and mapping of IHS platform components to the aggregation engine;

the aggregation engine to create a virtualized platform configuration register engine log structure, based on the list of handles and mapping of the IHS platform components the aggregation engine to, in response to detection of a new component in the IHS by the aggregation engine, send a topology rediscovery trigger to the security processor;

the security processor to, in response to the trigger, create a new virtualized platform configuration register engine;

the security processor to return a handle and map of the new virtualized platform configuration register engine to the aggregation engine; and the aggregation engine to update the virtualized platform configuration register engine log structure, based on the handle and map of the new virtualized platform configuration register engine.

19. The non-transitory computer readable medium of claim 18, wherein, upon execution by the IHS, the program instructions further cause, in response to a trigger of drift detection:

the aggregation engine to gather one or more measurements from each of one or more of the IHS platform components, and to provide the one or more measurements to the security processor;

the security processor to update a requested virtualized platform configuration register engine platform configuration register, and/or the security processor to update a requested virtualized platform configuration register engine platform configuration register key derivation function; and the aggregation engine to update a virtualized platform configuration register engine log entry of the virtualized platform configuration register engine log structure, based on the updated requested virtualized platform configuration register engine platform configuration register and/or the updated requested virtualized platform configuration register engine platform configuration register key derivation function.

20. The non-transitory computer readable medium of claim 19, wherein, upon execution by the IHS, the program instructions further cause:

the aggregation engine to determine if the triggered draft detection is complete and in response to a determination that the triggered draft detection is not complete cause:

the aggregation engine to repeat the gathering of one or more measurements from each of one or more components in the IHS and providing the one or more measurements to the security processor;

cause the security processor to repeat updating the requested virtualized platform configuration register engine platform configuration register and/or updating the requested virtualized platform configuration register engine platform configuration register key derivation function; and cause the aggregation engine to repeat updating the virtualized platform configuration register engine log entry.

* * * * *